US006678183B2

(12) United States Patent
Creger et al.

(10) Patent No.: US 6,678,183 B2
(45) Date of Patent: Jan. 13, 2004

(54) DC POWER CONDITIONING SYSTEM

(75) Inventors: Bruce E. Creger, Northfield, IL (US); David M. Adams, Aurora, IL (US)

(73) Assignee: SAFCO Corporation, Skokie, IL (US)

( * ) Notice: Subject to any disclaimer, the term of this patent is extended or adjusted under 35 U.S.C. 154(b) by 67 days.

(21) Appl. No.: 10/102,441

(22) Filed: Mar. 20, 2002

(65) Prior Publication Data

US 2003/0179597 A1 Sep. 25, 2003

(51) Int. Cl.[7] .................................................. H02M 1/00
(52) U.S. Cl. ........................................................ 363/146
(58) Field of Search .............................. 363/144, 146, 363/147

(56) References Cited

U.S. PATENT DOCUMENTS 6,157,163 A * 12/2000 Blackwood ................. 320/115
6,324,086 B1 * 11/2001 Hsieh ......................... 363/146
6,434,032 B1 * 8/2002 Romano ..................... 363/146

* cited by examiner

Primary Examiner—Adolf D. Berhane
(74) Attorney, Agent, or Firm—Dillis V. Allen, Esq.

(57) ABSTRACT

A power supply with DC surge and spike protection having additional, optional power conditioning and control functions such as low voltage protection, electro mechanical interferences(EMI) protection and radio frequency interference(RFI) protection. The device is for attachment to vehicular electrical systems for protecting, conditioning or controlling the input power to electrical devices such as computers, audio and video systems, PDA's, wireless phones, and other electronic products. The power supply includes a housing having a male cigarette lighter plug inserted into a vehicular cigarette lighter plug or DC power outlet, electrical circuitry in the housing and one or more female power receptacles into which the powered electrical devices DC connectors are inserted.

13 Claims, 6 Drawing Sheets

DC POWER CONDITIONING SYSTEM

BACKGROUND OF THE PRESENT INVENTION

The proliferation of DC powered and charged mobile/portable products has resulted in connecting these products to a vehicle's electrical system during all states of vehicle operation. Prior to the miniaturization of these products, the electrical power for operating or charging was from AC sources. AC power, although highly controlled, still produces significant fluctuations, transients and electrical noise. AC power conditioning is most often provided through a separate power conditioning device, commonly referred to as a surge and spike protector. AC power conditioning devices protect sensitive circuits from voltage spikes caused by lightning, electrostatic discharge and power surges caused by power grid interruptions and other potentially dangerous live transients.

12-volt direct current(DC) is potentially a more variable and complex electrical environment than traditional AC sources. The Society of Automotive Engineers(SAE) has defined the electrical environment in SAE specification SAE 1113/11, Section 8, Test Pulses and Appendix B, Test Severity Levels. Some examples from Section 8 and comments follow.

Although a normally operating vehicle will maintain a supply voltage of 11–16 VDC, many conditions occur which cause much larger voltage variations, ranging as low as 4.5 VDC to transients as high as 286 VDC with spikes varying from −150V to −600V. The vehicle circuits for some DC power outlets and cigarette lighter sockets are partially protected from adverse power conditions through a switch that disconnects the outlets from the line during engine starting. However, potentially damaging electrical transients, surges, spikes, and noise continue to exist within the vehicle power system.

Other surges and spikes occur because not all DC power outlets are disconnected from the battery during starting. Under very cold discharged battery conditions, the very large voltage swings, from 4.5 to 16 VDC, cause surges and large transients as vehicle systems are energized. Failure of the DC supply, through alternator control loss, and the switching of heavy vehicle loads, such as lights and air conditioning, are also primary sources of transients, overvoltage and induced spikes.

In SAE J1211, Table 3, SAE has summarized the four principle types of transients found in automotive wire harnesses. The transients and the possible effects on electronic devices is noted as follows:

| SOURCE | MAXIMUM TRANSIENT VOLTAGE | POSSIBLE EFFECTS ON ELECTRONICS |
|---|---|---|
| Load Dump | +120 | Circuit damage |
| Inductive load switching | −286 | Logic errors circuit damage |
| Alternator field decay | −90 | Logic errors |
| Mutual coupling | +214 | Logic errors circuit damage |

Unattended attachments of portable devices to a vehicle electrical system create another unusual condition for vehicle operation. Whereas the AC power sources are considered inexhaustible and continued attachment of portable products has no negative effects on the source; quite the opposite exists regarding vehicle power where the battery must retain sufficient energy to start the vehicle.

The automotive electrical environment can be electrically hazardous to connected equipment, such as cellular telephones, video equipment and computers, whose batteries are charged from the cigarette lighter through an adapter or powered directly from the vehicle DC power. The SAE, in paragraph 1.1 of SAE J1113/11 states as follows: "Installed electrical equipment is powered from sources which contain, in addition to the desired electrical voltage, transients with peak values many times this value, caused by the release of stored energy during the operation of a relay and/or other loads connected to the source while starting and/or turning off the vehicle."

SAE Standard J1113/11 defines tests which are to be conducted to replicate the potential conducted transients developed in 12 volt DC powered passenger cars, light trucks and heavy duty trucks. The need and value of the Power Supply is evident by the recommended test voltages contained in J1113/11, Table 3. Test pulse parameters require test pulses from −25 to −100V for passenger cars and light duty trucks; −11 to −600V for 12 volt system heavy duty trucks. Other specified test pulse conditions are equally or more severe.

Many adapters or connected input circuits cannot tolerate the large voltage spikes that can occur when a vehicle is jump started, or when its battery is disconnected while the car is running. Even window, heater, and starter motors can generate spikes well beyond the normal range of battery voltage.

It is a primary object of the present invention to provide a portable DC Power Supply for portable electronic components on board a vehicle that protects both the portable components as well as the vehicle's electrical system.

SUMMARY OF THE PRESENT INVENTION

In accordance with the present invention, a DC Power Supply is provided for portable electronic components on board a vehicle that protects both the portable components as well as the vehicle's electrical system including circuitry to sense and suppress voltage spikes or current surges and to disconnect the female cigarette lighter receptacles when the vehicle power outlet voltage drops below a preset threshold.

The power supply has sensing, switching and optimal control circuits that sense voltage spikes, current surges and other abnormalities in the vehicle's electrical systems and rapidly directs excess voltages, suppresses current surges and responds to other electrical abnormalities before they can reach the power input connector of the connected devices. When optional features such as low voltage protection are added to the circuits, the power supply disconnects the power to connected devices when the vehicle's voltage to the power supply falls below preset thresholds. Short circuit and overload protection is provided through foldback circuitry or fusings.

Toward these ends the present power supply includes a DC surge and spike and an optional low voltage protector for attachment to vehicular electrical systems for powering electrical devices such as computers, audio and video products, PDA's, wireless phones, and other electronic devices, including in one embodiment, a housing having a plug connector insertable into an on-board outlet, a plug receiving type outlet in the housing, and a circuit in the housing having a main FET switch that redirects excess voltage when it senses rapidly rising voltage at the input, and also disconnects the input from the output when input voltage falls below a threshold value.

The circuit operates by redirecting excess voltage from the vehicle's electrical system at the first sign of a voltage spike. A programmable shunt regulator is used to sense the rapidly rising voltage as well as steady-state voltage above a setpoint. After a time delay, the main switch begins to turn on again and if the input voltage is still high, the circuit acts as a series regulator, allowing the load to see only a set point voltage.

The circuit also protects the vehicle's battery by turning the main switch off when battery voltage falls below safe levels. However, the load should not be disconnected prematurely by a transient voltage drop that occurs in some vehicles at start-up. A second programmable shunt regulator responds to low input voltage by drawing less current, which shunts gate drive away from the main switch FET.

Other objects and advantages will appear more clearly from the following detailed description.

DETAILED DESCRIPTION OF THE PREFERRED EMBODIMENTS

Figure 1:
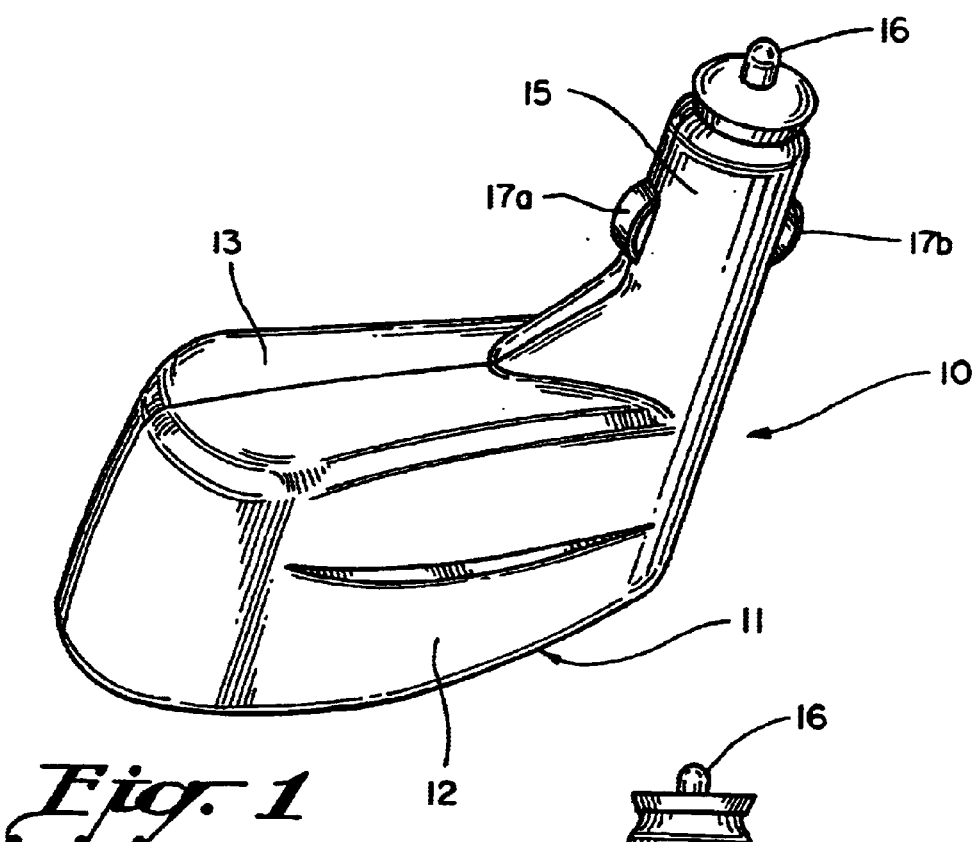
FIG. 1 is a perspective view of a DC power supply with circuit protection according to the present invention.
Figure 2:
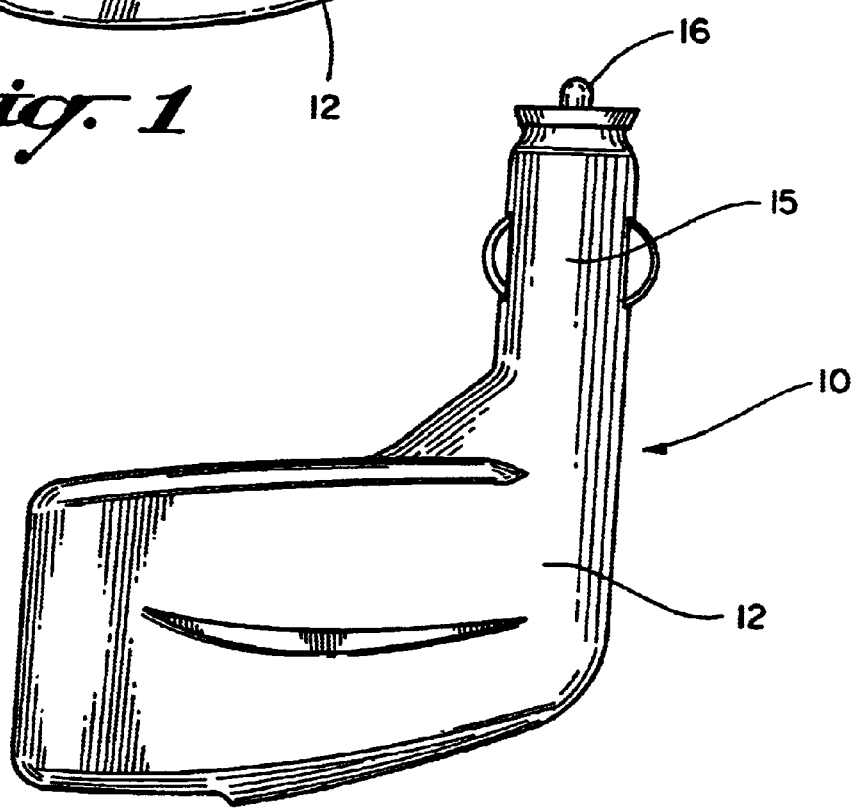
FIG. 2 is a left side view of the DC power supply illustrated in FIG. 1.
Figure 3:
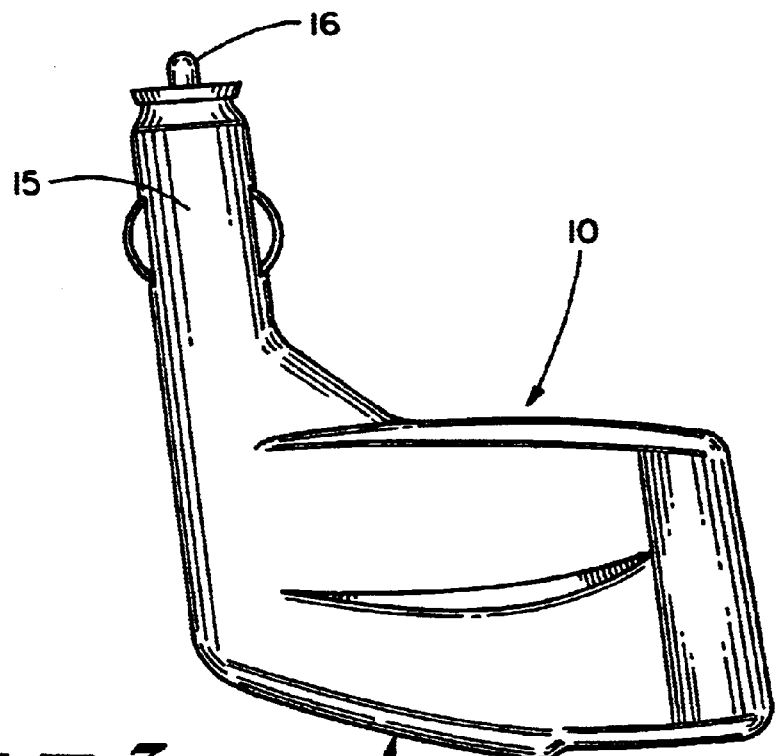
FIG. 3 is a right side view of the DC power supply illustrated in FIGS. 1 and 2.
Figure 4:
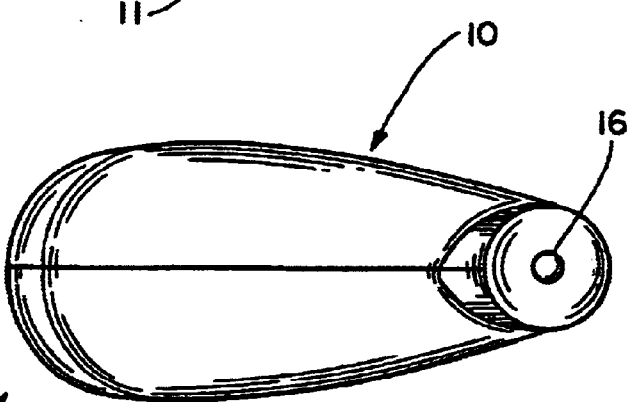
FIG. 4 is a top view of the DC power supply illustrated in FIGS. 1 to 3.
Figure 5:
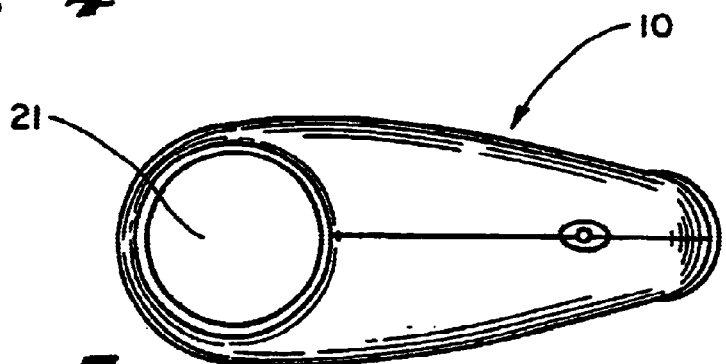
FIG. 5 is a bottom view of the DC power supply illustrated in FIGS. 1 to 4.
Figure 6:
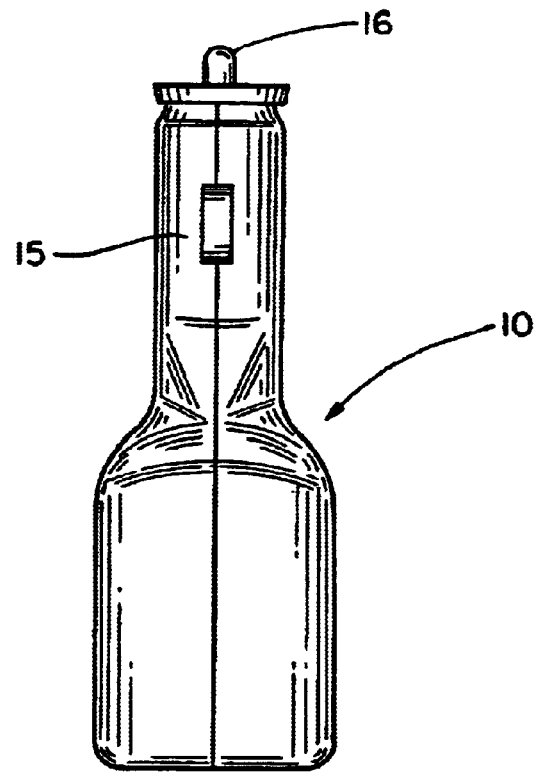
FIG. 6 is a rear view of the DC power supply illustrated in FIGS. 1 to 5.
Figure 7:
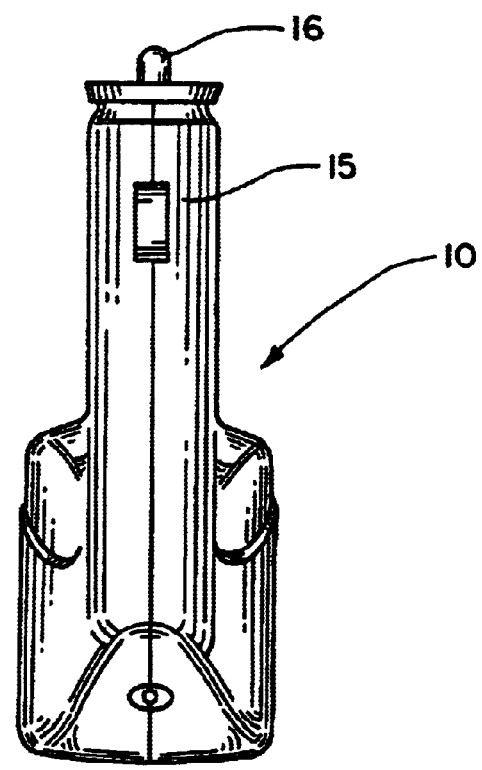
FIG. 7 is a front view of the DC power supply illustrated in FIGS. 1 to 6.

Referring to the drawings, a single outlet power supply 10 is illustrated that is specifically designed to be plugged into a cigarette lighter-type socket on board a vehicle such as cars, trucks, certain airplanes, and certain marine vehicles, but it should be understood that the power supply 10 can be modified to be inserted into other types of standard on board DC power supplies. The power supply 10 is a portable device in that it is not hard-wired into the electrical system of the vehicle. As noted above, the power supply 10 is designed to provide power to personal electronic components with surge and spike protection and to terminate power supply to such electronic components when battery voltage falls below a predetermined level.

The present power supply 10 is designed for 12 volt systems, but it should be understood that this power supply is designed for other vehicular DC electrical circuits other than 12, although of course such are almost industry-wide vehicular standards.

Figure 8:
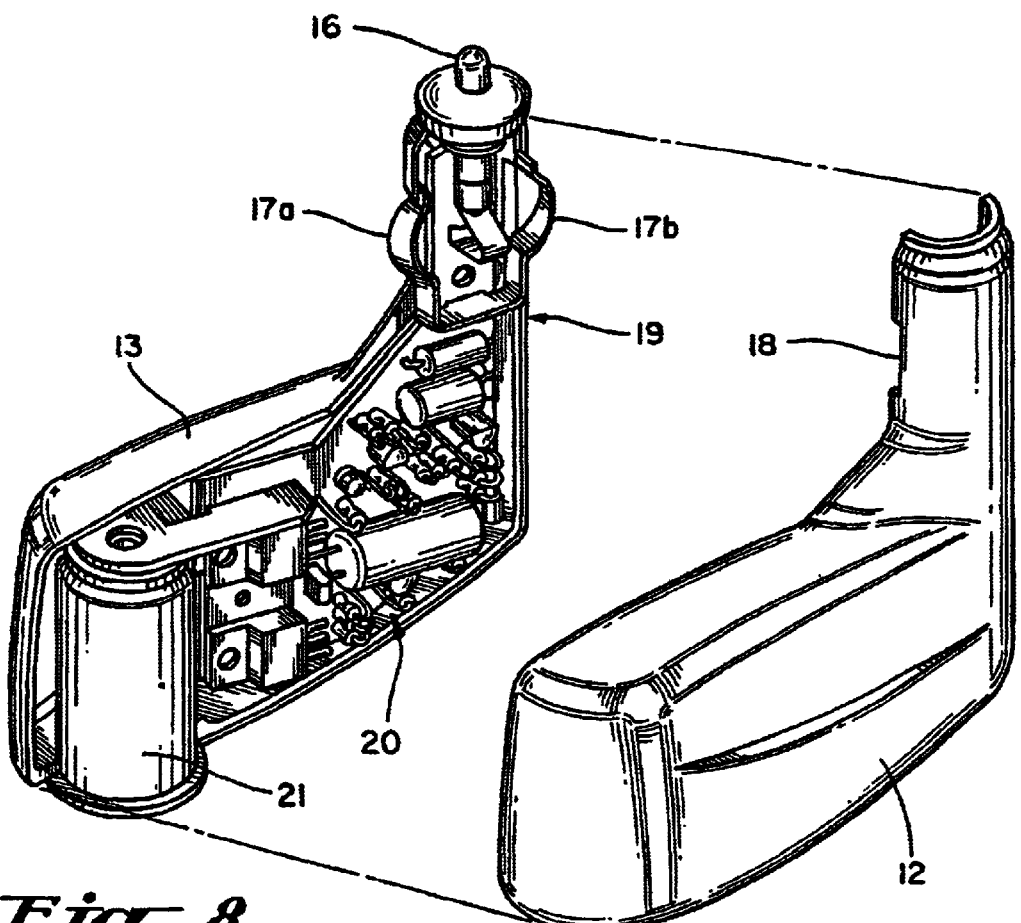
FIG. 8 is an exploded view of the DC power supply illustrated in FIGS. 1 to 7 showing the input plug connector, the output plug socket, and the contained circuit board.

The power supply 10 includes a generally L-shaped thermoplastic housing 11 that includes a first housing half 12 and a second housing half 13 clamshelled together as seen more clearly in FIG. 8.

The housing 11 has an input plug 15 defined by the housing halves 12 and 13 adapted to be plugged into a cigarette lighter-type DC outlet receptacle onboard the vehicle. Plug 15 has a first central metallic contact 16 coaxial with plug 13 and a second terminal contact 17a and 17b(not shown in FIGS. 2 to 7) projecting diametrally out slots 18 in the plug 15 formed by a spring-like member 19. Contacts 16 and 17 supply DC power from the vehicle's electrical system through circuit board 20 to an outlet receptacle 21 mounted in the housing that receives a plug similar to plug 15 wired to the electrical component to be supplied power.

Figure 11:
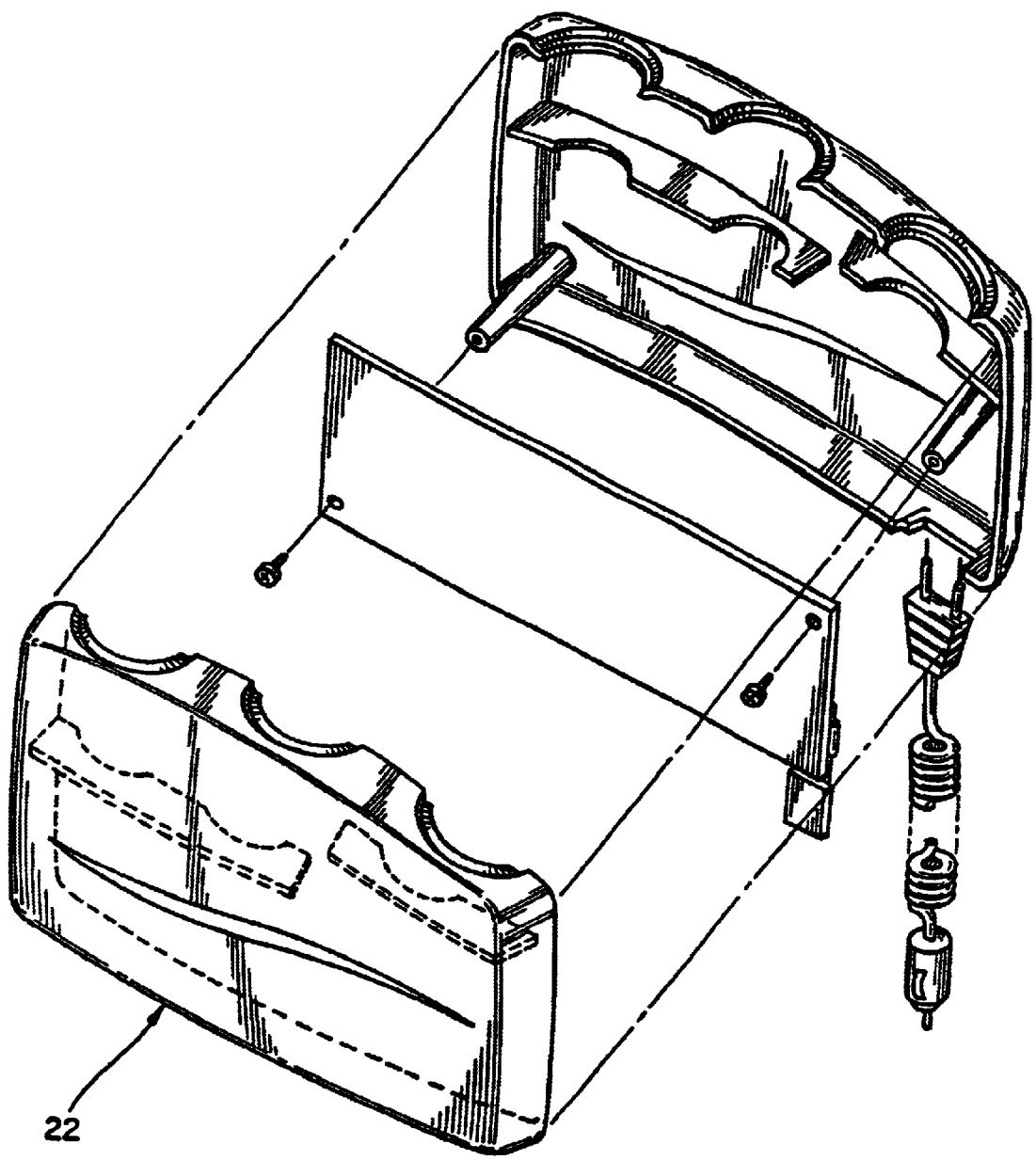
FIG. 11 is an exploded view of a three outlet embodiment with certain parts removed therefrom.

It should be understood that there could be provided more than one outlet connector 21, and in fact could take the form of a three outlet power supply such as shown at 22 in FIG. 11.

Figure 9:
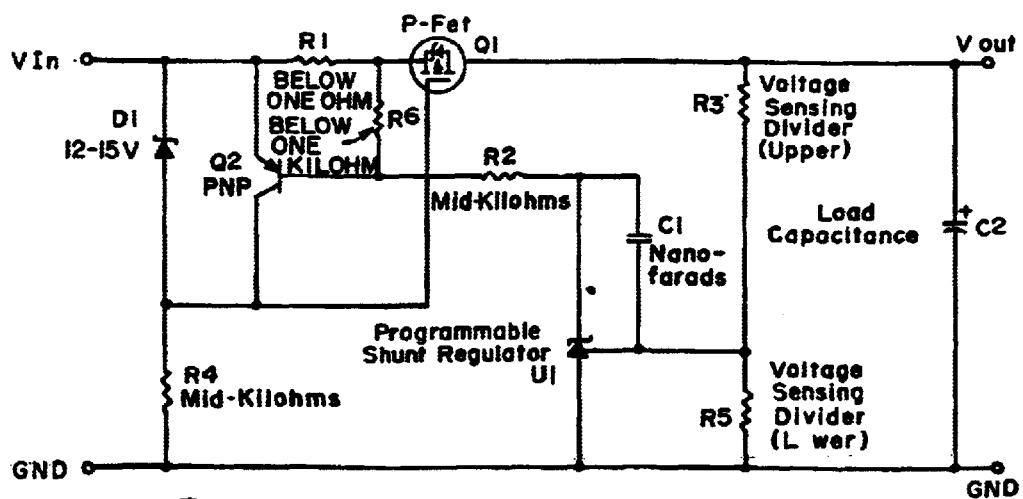
FIG. 9 is a schematic of the circuitry on the circuit board shown in FIG. 8.

Referring to the circuit depicted in FIG. 9, the circuit operates by redirecting excess voltage from the car's electrical system at the first sign of a voltage spike.

The supply voltage applied by R4 to its gate turns on Q1(FET). Gate voltage is limited by D1.

On the leading edge of a spike, while voltage is rising rapidly, transistor Q2 is turned on, which rapidly turns off Q1, disconnecting the output of the circuit from the power source. C2 will maintain the output voltage during the brief shutdown period.

A programmable shunt regulator U1 is used to sense rapidly rising voltage, and steady-state voltage above a setpoint. When U1 sees a rapidly rising voltage at its cathode, C1 applies current to its reference electrode, and U1 sinks more current. The additional current is what turns on Q2 during a transient.

After a time determined by R5 and C1(typically less than 50 microseconds), Q1 will again begin to turn on as U1 turns off. If the input voltage is still high (above the setpoint established by R3, R5, and U1's reference threshold), the circuit will act as a series regulator, allowing the load to see only the setpoint voltage.

With the input voltage above the R3-R5-U1 setpoint, the circuit would be unstable with capacitive loads without the compensation provided by R1. Voltage due to the load current thru R1 adds to the base-emitter voltage on Q2, which provides negative feedback. As Q1 allows more current to pass, its drive is removed by Q2. The circuit behaves as a current-mode regulator, controlled by the sink current provided by U1, which is responsive to the load voltage.

Figure 10:
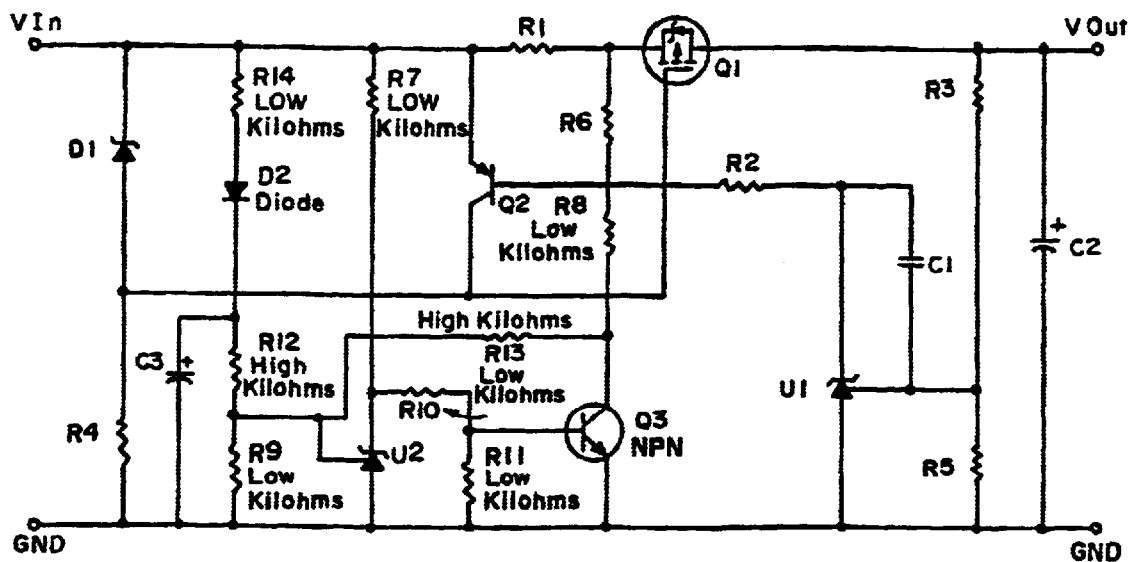
FIG. 10 is a schematic similar to FIG. 9 with additional low voltage circuitry.

The circuit illustrated in FIG. 10 contains all the components illustrated in FIG. 9 and operates in the same fashion as the FIG. 9 circuit, except that additional circuitry has been added to the FIG. 9 circuitry in FIG. 10 to provide low voltage shutdown and starting dip ride ride-through.

It is desirable for the circuit to protect the vehicle battery by cutting off load current when battery voltage falls below safe levels. However, at the same time, the load should not be disconnected unnecessarily.

Q3 provides a second means of shutting off the FET. Q3 is controlled by a second programmable shunt regulator, U2, which responds to low input voltage by drawing less current, allowing Q3 to turn on, turning on Q2, which shunts gate drive away from the FET.

U2's reference voltage and divider R14-D2-R12-R9 determine the low voltage cutoff threshold. Resistor R13 adds some hysteresis to insure that the battery is being charged before permitting the load to be reconnected.

Diode D2 and C3 add some delay to the low-voltage shutdown. During vehicle starting, battery voltage can briefly dip to half of normal values. C3 prevents the load from being disconnected by holding up the voltage applied to U2's reference until the starting dip is over.

What is claimed is:

1. A DC power supply for electronic components powered by the DC electrical system of vehicles, comprising:

a housing, a standard plug type connector connected electrically to the housing adapted to be inserted into a DC outlet in the vehicle, said housing having a standard plug receiving type outlet adapted to receive a plug type connector for powering the electronic components, and a surge and spike protector circuit in the housing having an input connected to the plug type connector and an output connected to the housing plug receiving type outlet including a main power switch for connecting and disconnecting the input from the output, and control circuitry for the power switch for turning the power switch off when it senses rapidly rising voltage at the input.

2. A DC power supply for electronic components as defined in claim 1, wherein the control circuitry for the power switch includes a programmable shunt regulator U1.

3. A DC power supply for electronic components as defined in claim 1, wherein the control circuitry turns the power switch back on after voltage drops to below preset level.

4. A DC power supply for electronic components as defined in claim 3, wherein the control circuitry limits voltage at the output after the control circuitry turns the power switch back on even though voltage at the input may be above a predetermined value.

5. A DC power supply for electronic components as defined in claim 4, wherein the function of the control circuitry to limit voltage at the output after the control circuitry turns the power switch back on includes a programmable shunt regulator and a voltage divider that act as a series regulator.

6. A DC power supply for electronic components as defined in claim 1, wherein the control circuitry for the power switch includes components for turning the main switch off when voltage at the input falls below a predetermined value to protect the vehicle's electrical system.

7. A DC power supply for electronic components as defined in claim 6, wherein the components delay turning the main switch off for a predetermined time to prevent transient dips in input voltage from turning the main power switch off.

8. A DC power supply for electronic components as defined in claim 6, wherein the components include a programmable shunt regulator U2 that determines the low voltage cutoff threshold.

9. A DC power supply for electronic components powered by the DC electrical system of vehicles, comprising:

a housing, a standard plug type connector electronically connected to the housing adapted to be inserted into a DC outlet in the vehicle, said housing having a standard plug receiving type outlet adapted to receive a plug type connector for powering the electronic components, and a protector circuit in the housing having an input connected to the plug type connector and an output connected to the housing plug receiving type outlet including a main power switch for connecting and disconnecting the input from the output, and control circuitry for the power switch for turning the power switch on and off, said control circuitry for the power switch including components for turning the main switch off when voltage at the input falls below a predetermined value to protect the vehicle's electrical system.

10. A DC power supply for electronic components as defined in claim 9, wherein the components delay turning the main switch off for a predetermined time to prevent transient dips in input voltage from turning the main power switch off.

11. A DC power supply for electronic components as defined in claim 9, wherein the components include a programmable shunt regulator U2 that determines the low voltage cutoff threshold.

12. A DC power supply for electronic components as defined in claim 9, wherein the control circuitry also turns the power switch off when it senses rapidly rising voltage at the input.

13. A DC power supply for electronic components as defined in claim 12, wherein the control circuitry for the power switch includes a programmable shunt regulator U1, said control circuitry turns the power switch back on after voltage drops to below preset level, said control circuitry limits voltage at the output after the control circuitry turns the power switch back on even though voltage at the input may be above a predetermined value.

* * * * *